United States Patent Office 3,654,276
Patented Apr. 4, 1972

---

3,654,276
PROCESS FOR MANUFACTURING IMIDAZOLES
Walter Hafner, Bavaria, Germany, assignor to Consortium fur Electrochemische Industrie G.m.b.H., Bavaria, Germany
No Drawing. Filed Sept. 3, 1968, Ser. No. 757,166
Claims priority, application Germany, Sept. 2, 1967,
P 16 70 459.9
Int. Cl. C07d 49/36
U.S. Cl. 260—268 H    3 Claims

ABSTRACT OF THE DISCLOSURE

Process for manufacturing imidazoles, by reacting an oxazole of the general formula

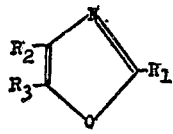

where $R_1$ is hydrogen, an aliphatic or araliphatic radical containing no carbon-carbon double bond in alpha position with respect to the ring, and $R_2$ or $R_3$ are hydrogen, an aliphatic or an aromatic radical with primary amines of the general formula $NH_2R$ where R is an aliphatic, such as an alkyl radical of up to 18 carbon atoms, which may be substituted by hydroxyl-, ether, amino or alkylamino groups, araliphatic or aromatic radical, with a hydrogen ion splitting compound having a dissociation constant in water of at least $10^{-10}$.

BACKGROUND OF THE INVENTION

It is known that a number of oxazoles can be converted, by heating with alcoholic ammonia solution or formamide, into the corresponding imidazoles. Likewise, reference is made in the literature regarding the manufacture of N-phenyl substituted imidazoles made of oxazole-4-carboxylic acids and aniline wherein the carboxyl group is said to facilitate the reaction as a result of its negative inductive effect.

SUMMARY OF THE INVENTION

Surprisingly, I have now discovered that compounds that split off hydrogen ions essentially promote or, in part, make at all posible the conversion of oxazoles to imidazoles. As a result of the presence of these compounds, in the conversion with $NH_3$ yields are substantially improved and, in the conversion of primary amines, even those oxazoles whose ring does not contain any carboxyl group react to form N-substituted imidazoles.

The process of the present invention for the manufacture of imidazoles is characterized by the reaction of oxazoles of the general formula

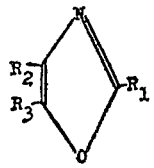

where $R_1$ is hydrogen, an aliphatic or araliphatic radical not containing any carbon-carbon double bond in alpha position with respect to the ring, and $R_2$ or $R_3$ are hydrogen, an aliphatic or an aromatic radical with primary amines of the general formula $NH_2R$ where R is an aliphatic, such as an alkyl radical of up to 18 carbon atoms, which may be substituted by hydroxyl-, ether, amino or alkylamino groups, araliphatic or aromatic radical, in the presence of hydrogen ion splitting compounds having a dissociation constant in water of at least $10^{-10}$.

The aliphatic or araliphatic radicals on the oxazole ring may be long or short-chained, it is for instance possible to convert oxazoles with substituents up to 18 or more carbon atoms. Furthermore, they may be branched or unbranched, and saturated or unsaturated, wherein however the double bond must not be in conjugation with the double bonds of the oxazole ring. Preferably, one uses oxazoles wherein the radicals $R_1$, $R_2$ and $R_3$ are alkyl radicals having up to 18 carbon atoms. The araliphatic or aromatic radicals can be substituted in the aromatic nucleus by alkyl radicals. The radicals $R_1$, $R_2$ and $R_3$ may furthermore carry one or several molecule groups as substituents, such as, for instance, amine-, hydroxyl-, alkoxy-, aryloxy-, carbonyl-, carboxyl-groups or derivatives of the carboxyl group, such as ester groups.

An oxazole suitable for the reatcion is for instance the 2, 4, 5-trimethyloxazole readily obtainable from 3-chlorbutanon-2 and acetic acid over the acetoin ester. By the use of longer chain carboxylic acids in lieu of the acetic acid, it is possible to manufacture in a simple manner 4,5-dimethyloxazoles with longer alkyl substituents as reaction components in secondary position.

Suitably primary aliphatic amines can be derived from aliphatic, araliphatic or aromatic compounds. The aliphatic or araliphatic radicals used in that connection may be long or short-chained. Aliphatic radicals having up to 12 carbon atoms are of interest, although radicals with more C-atoms also can be used. In addition, they may be saturated or unsaturated, and branched or unbranched. The araliphatic or aromatic radicals my contain as substituents additional alkyl radicals in the aromatic nucleus. Furthermore, the amines can be singly or multiply substituted in their aliphatic, araliphatic or aromatic radicals by molecule groups such as, for instance, the hydroxyl-, ether-, amino-, or alkylamino-groups.

Ethanol amine reacts for instance with favorable yields to N-($\beta$-hydroxyethyl)-imidazoles. It is possible to manufacture high molecular weight condensation products from diamines and corresponding oxazoles, such as, for instance, hexamethylene diamine and 1,2-di-(dimethyloxazolyl)-ethane.

Catalytic efficacy is achieved by all hydrogen ion splitting compounds whose dissociation constant in water amounts to at least $10^{-10}$. Particularly suitable are compounds that are readily soluble in the reaction mixture, that do not form any salts which are difficult to dissolve, and that do not result in any secondary reactions, such as, for instance, an oxidative decomposition. Preferably suitable are for instance acids, such as hydrochloric acid, acetic acid, or p-toluene sulfonic acid; particularly good yields were obtained by means of p-toluene sulfonic acid. The results obtained by means of ammonium chloride were likewise satisfactory. These compounds have a reaction accelerating effect if they are present in catalytic quantities of 0.01 mol percent with respect to the amine used; however, an excess amount may also be used when for instance acetic acid is used as a solvent. As a rule, one preferably adds to the reaction mixture 1–10 mol percent, with respect to the amine used, of the hydrogen ion splitting compound.

DESCRIPTION OF THE PREFERRED EMBODIMENTS

In general, the reaction is performed in such a way that the reaction components are heated with the catalyst under reflux or in the autoclave. In most cases, temperatures up to 160° C. are adequate. Depending on the stability of the reaction components, higher temperatures may also be used. In general, suitable reaction temperatures are between 100–200° C. The quantity ratio in which the reaction components can be used may be equimolar, and it is also possible that one reaction component is present either in excess or in an amount that is less than that of the other one. Through selection of suitable quantity ratios, it is possible, in the case of primary diamines, to have the reaction occur predominantly at one or at both amine groups. The reaction products are generally worked up by means of distillation, recrystallization or sublimation. Further particulars regarding the application of the process in accordance with the invention can be gathered from the examples.

The substances manufactured in accordance with the process of the invention are useful as intermediate products for the chemical and pharmaceutical industries. They can also, for instance, be used in the manufacture of parasite-controlling agents. They are furthermore of interest in the area of surface-active compounds, as well as agents for antistatic finishing of textiles and plastics.

EXAMPLE 1

N-(β-hydroxyethyl)-2,4,5-trimethyl imidazole 555 g. 2,4,5-trimethyl oxazole are heated under reflux with 916 g. ethanolamine and 16.6 g. glacial acetic acid under stirring for five hours. In the course of the distillative separation, N-(β-hydroxyethyl)-2,4,5-trimethyl imidazole goes over at 194–200° C. and 10 torr. By dissolving in hot water, admixture of potassium carbonate and evaporation to dryness, it is possible to obtain from the distillation residue an additional smaller amount of the product. The yield is 87% of theory. Purification by recrystallization from ethanol results in a compound having a melting point of 149° C. and a boiling point of 205° C./10 torr.

EXAMPLE 2

N-benzyl-2-ethyl-4,5-dimethyl imidazole 54 g. benzylamine and 54 g. of a mixture comprising approx. 70% 2-ethyl-4,5-dimethyl oxazole and approx. 30% aniline are heated under stirring for 5 hours under reflux. The boiling temperature remins constant at 147° C. Following the admixture of 1 cc. acetic acid, the reaction occurs accompanied by a drop in the boiling temperature to 136° C. and the formation of water. Following distilling off of the water, the reaction temperature rises to 182° C. The work-up is performed by means of vacuum distillation. The colorless, viscous liquid passing over at 125° C. and 1 torr is dissolved in 1 N sulfuric acid for the purpose of removing acetyl benzylamine, and the solution is extracted with ether. Following admixture of soda lye to the solution to alkaline reaction, the N-benzyl-2-ethyl-4,5-dimethyl imidazole is extracted with ether, dried with potassium carbonate and distilled. Yield 50% of theoretical. Boiling point 172° C./10/torr.

EXAMPLE 3

1,6-di-(2,4,5-trimethyl imidazolyl)-hexane 120 g. 2,4,5-trimethyl oxazole, 10.5 g. hexamethylene diamine and 0.1 g. acetic acid are heated for 15 hours, using a fractionating tower attachment whereby overdistilled oxazole-water-azeotrope is dried with potassium carbonate and the oxazole is returned into the reaction vessel. In the distillation work-up, the desired product is converted at 218–220° C. and 0.04 torr. Yield: 45.5% of theory. Additional purification by recrystallization from cyclohexane and sublimating. White hygroscopic crystals. Melting point 114° C.

The conversion can also be performed by six-hour heating to 160° C. in the V4A autoclave, the yields being better in such case.

EXAMPLE 4

N-hexamethylene amino-2,4,5-trimethylimidazole 14.4 g. 2,4,5-trimethyl oxazole are heated with 30 g. hexamethylene diamine and 0.3 g. glacial acetic acid to 160° C. in a glass-lined autoclave for 5½ hours. Following cooling, some precipitated hexamethylene diamine is filtered off and the reaction mixture is separated by distillation. N-hexamethylene amino-2,4,5-trimethyl imidazole goes over at 116–117° C. and 0.02 torr as a water-clear liquid. Yield: 49.3% of theory. 3.5 g. 1,6-di-(2,4,5-trimethyl imidazolyl)hexane can be isolated from the residue by extraction with hot cyclohexane.

EXAMPLE 5

N-butyl-2-propyl-4,5-dimethyl imidazole 20 g. 2-propyl-4,5-dimethyl oxazole, 42 g. butyl amine and 2.1 g. glacial acetic acid are heated to 160° C. in a V4A glass-lined shaking-type autoclave for 5½ hours. Upon separation by distillation, N-butyl-2-propyl-4,5-dimethyl imidazole goes over as a colorless liquid at 97–98° C. and 0.05 torr. Yield: 33% of theory.

EXAMPLE 6

N-(β-ethylhexyl)-2,4,5-trimethyl imidazole 40 g. 2,4,5-trimethyl oxazole, 49 g. 1-amino-2-ethyl hexane and 2.33 g. glacial acetic acid are boiled under reflux for 6 hours. Upon work-up by distillation, the N-(β-ethylhexyl)-2,4,5-trimethyl imidazole, contaminated by 1-amino-2-ethyl hexane, goes over at 100–110° C. and 0.07 torr. Purifying of the raw product is achieved by heating it for one hour with the identical amount of acetic acid anhydride, acidification with dilute hydrochloric acid, extracting with ether, mixing of the HCl-containing solution with lye until alkaline reaction, whereby an organic phase is precipitated which is separated. The aqueous phase is extracted with ether and the ether layer combined with the organic phase, dried with sodium sulfate and distilled. N-(β-ethylhexyl)-2,4,5-trimethyl imidazole goes over at 99° C. and 0.07 torr. Yield: 38.2% of theory.

EXAMPLE 7

N-phenyl-2,4,5-trimethyl imidazole 20 g. 2,4,5-trimethyl oxazole, 67 g. aniline and 3.4 g. glacial acetic acid are heated for 5½ hours in a glass-lined V4A shaking-type autoclave to 160° C. Upon separation by distillation the N-phenyl-2,4,5-trimethyl imidazole, contaminated with acetanilide, goes over at 96–115° C. and 0.1 torr. A part of the acetanilide can be removed by filtering through mixing with cyclohexane. The filtrate is extracted by shaking with 2 N hydrochloric acid, the aqueous phase is extracted with ether, is rendered alkaline with alkaline soda and the N-phenyl-2,4,5-trimethyl imidazole is absorbed in ether. Following drying of the ether extracts with sodium sulfate, the N-phenyl-2,4,5-trimethyl imidazole goes over during distillative separation at 112–114° C. and 0.3 torr. Yield: 23% of theory.

EXAMPLE 8

N-dodecyl-2,4,5-trimethyl imidazole 120 g. trimethyl oxazole and 32 g. dodecylamine are heated to 160° C. with 38 g. dodecylamine hydrochloride in a V4A shaking-type autoclave with a glass lining for five hours. The reaction product is extracted by shaking with aqueous potassium carbonate solution, the organic layer is separated off and distilled. First water and trimethyl oxazole go over, followed by unreacted dodecylamine. N - dodecyl - 2,4,5 - trimethyl imidazole is obtained in the receiver at 176–178° C. and 1 torr. Yield: 23 g.

EXAMPLE 9

1,2-di-(β-hydroxyethyl-4,5-dimethyl imidazolyl-2)-ethane 45 g. ethanolamine are heated with 2.4 g. ammonium chloride until the major part of ammonia has escaped. Then, 9.5 g. of 1,2-di-(4,5-di-methyl oxazolyl-2)-ethane were added and heated for 2 hours under reflux. Water and excess ethanol were removed by distillation and, subsequently, the residue from the ethanol was recrystallized. Yield: 78% of theory. Melting point 262° C.

EXAMPLE 10

N-(β-hydroxyethyl)-2-propyl-4,5-dimethyl imidazole 122 g. ethanolamine are heated with 5.3 g. ammonium chloride until the major part of ammonia has escaped. Following the addition of 69.5 g. of 2-propyl-4,5-dimethyl oxazole, heat is applied under reflux for 5 hours during which the resultant water is, at the same time, continuously removed from the reflux. Excess ethanolamine is subsequently removed by distillation in water jet vacuum. N - (β - hydroxyethyl) - 2 - propyl - 4,5 - dimethyl imidazole goes over at 195–200° C. and 10 torr. Melting point 75° C. Yield: 74.7 g. Another 11 g. of a less pure product can be distilled out of the residue following the dissolution of same in hot water, admixture of potassium carbonate solution and boiling down to dryness.

EXAMPLE 11

59 g. 2 - methyl - 5 - phenyl oxazole and 60 g. ethanolamine were boiled with 3 g. acetic acid under reflux for 3 hours. Subsequently, the reaction mixture was subjected to distillation. Following the removal of water and unreacted initial material there were obtained 62 g. of a resin-like distillate at a temperature between 220 and 238° C. and 0.5 to 1 torr. By recrystallization from benzene by using activated carbon, there were obtained 22 g. white, crystalline 1 - β - hydroxyethyl - 2 - methyl - 5 - phenyl imidazole. Melting point 117° C.

EXAMPLE 12

60 g. 1 - amino - 3 - N - dimethylaminopropane and 1.35 g. $NH_4Cl$ were heated together to about 60° C. for ½ hour. Then, 50 g. 2-undecyl-4,5-dimethyl oxazole were added and the mixture heated to 180° C. in a glass-lined autoclave for 6 hours. Subsequently, excess amine and a small amount of water were removed by distillation under reduced pressure. The residue was diluted with butanol and extracted by shaking with a $K_2CO_3$ solution. The aqueous layer was again extracted with butanol and the organic phases were brought together and distilled. Following removal of the solvent and unreacted oxazole, there were obtained 45 g. of rather pure 1 - γ - N - dimethylaminopropyl - 2 - undecyl - 4,5 - dimethyl imidazole at 178 and 180° C. at approximately 0.5 torr. Compared to converted oxazole, the yield is practically quantitative.

EXAMPLE 13

115 g. of 2 - heptadecyl - 4,5 - dimethyl oxazole, 105 g. ethanolamine and 5 g. acetic acid were heated under stirring to 165° C. for six hours. Subsequently, water, excess ethanolamine and unconverted oxazole were extracted by distillation under reduced pressure. The residue was dissolved in hot alcohol and treated with activated carbon. Upon cooling, and having been left standing overnight, white 1 - β - hydroxyethyl - 2 - heptadecyl-4,5-dimethyl imidazole crystallized out, which was extracted by filtration, washed with ethanol and dried. 46 g. Melting point 86° C.

EXAMPLE 14

50 g. trimethyl oxazole and 50 g. 1-aminopropanol-2 were heated under stirring and reflux for three hours. During this period, the boiling temperature dropped from 133° to 132° C. Subsequently, the reaction mixture was separated by distillation under reduced pressure. In addition to the initial material in unaltered condition, there were obtained 5.5 g. 1 - β - hydroxypropyl - 2,4,5 - trimethyl imidazole.

Upon performing the identical test by adding 5 g. p-aminobenzoic acid, the boiling temperature dropped down to 124° C. as a result of increased formation of water. Upon workup by means of distillation, there remained a greater residue which consisted predominantly of the salt of the reaction product with the p-aminobenzoic acid. It was dissolved in water rendered alkaline by means of $K_2CO_3$, and extracted with butanol. By distillation, it was possible to obtain further product out of the extract. On the whole, one obtained thereby 43.5 g. of a rather pure 1-β-hydroxypropyl-2,4,5-trimethyl imidazole.

Upon inserting 38 g. trimethyl oxazole and 38 g. 1-aminopropanol-2, as well as 5 g. aminoacetic acid, the reaction temperature drops to 125.5° C. in the course of three hours. In this connection it should be pointed out that the aminoacetic acid was only partly dissolved in the reaction mixture. The yield of 1-β-hydroxypropyl-2,4,5-trimethyl imidazole amounted in this case to 16.85 g. Boiling point approximately 140° C. at a pressure of approximately 0.5 torr. Melting point 108° C. following recrystallization from alcohol and acetone.

EXAMPLE 15

25 g. γ-aminopropanol-1 were heated with 0.85 g. $N_4Cl$ to 90° C. for 30 minutes. Then, 40 g. 2-undecyl-4,5-dimethyl oxazole were added and the whole was heated under stirring to 165° C. for four hours. The workup proceeded initially as set forth in Example 12. The raw product was dissolved in hot water under the admixture of HCl up to a pH of 3.5 and treated with activated carbon. Thereupon it was rendered slightly alkaline by means of $K_2CO_3$, with the product separating out in the form of brown crystals. Additional distillation (boiling point 200° C. at aproximately 0.5 torr) produced 20.2 g. light yellow 1-γ-hydroxypropyl-2-undecyl-4,5-dimethyl imidazole. Melting point 44° C.

EXAMPLE 16

35 g. 1-amino-2-N-dimethylaminoethane, 1.3 g. ammonium chloride and 50 g. 2-undecyl-4,5-dimethyloxazole were caused to react and were worked up. Following two distillations, there were obtained 35 g. 1-β-N-dimethylaminoethyl-2-undecyl-4,5-dimethylimidazole in the form of a bright yellowish liquid having a boiling point of 157° C. at approximately 0.5 torr. First and last runnings of the distillation contained additional product.

EXAMPLE 17

50 g. 2-undecyl-4,5-dimethyl oxazole, 90 g. 3-(2-ethylhexoxy)-propylamine-1 and 2.5 g. ammonium fluoride were heated in an open vessel to 160–180° C., under stirring, for 6½ hours. Subsequently, the unconverted parts of the initial products were removed by distillation under reduced pressure. The residue was absorbed with ether and aqueous $K_2CO_3$ solution. The aqueous phase was discarded, and the ethereal one was treated with activated carbon. Following removal of the solvent and small first runnings, the reaction product was finally subjected to a short distillation at 180 to 200° C. and a pressure of $10^{-3}$ to $10^{-4}$ torr. There were obtained approximately 38 g. 1-γ-(2-ethylhexoxy)-propyl-2-undecyl-4,5-dimethyl imidazole as a yellow oil.

EXAMPLE 18

N-(β-hydroxyethyl)-2-[decen(9)-yl(1)]-4,5-dimethyl imidazole 37 g. 2-[decen(9)-yl(1)]-4,5-dimethyl oxazole are heated with 75 g. ethanolamine and 5.5 g. ammonium chloride under stirring to 160° C. for 8 hours. The subsequent distillation workup yielded in addition to excess ethanolamine and small transition fractions, 30 g. of N-

(β-hydroxyethyl)-2-[decen(9)-yl(1)]-4,5-dimethyl imidazole which went over in the form of a viscous yellow oil between 192 and 215° C. at 0.005 torr and solidified after standing for a while. For purification, the product was dissolved in water with the admixture of a few drops of hydrochloric acid, treated with activated carbon and the free base was precipitated with $K_2CO_3$. Melting point 55° C.

EXAMPLE 19

N-(β-hydroxyethyl)-4,5-dimethyl imidazole 5 g. ammonium chloride and 250 g. ethanolamine are heated together to 110° C. until the major part of $NH_3$ has escaped. Then, 50 g. 4,5-dimethyl oxazole are added and the temperature is raised slowly to 150° C. The reaction mixture is maintained at this temperature for 2 hours. It is then worked up by distillation. N-(β-hydroxyethyl)-4,5-dimethyl imidazole is recovered at 162° C. and 0.5 torr and can be purified by recrystallization from acetone under cooling with ice. Melting point 103–106° C. Yield: approx. 50% of theory.

EXAMPLE 20

N-(β-hydroxyethyl)-2-benzyl-4,5-dimethyl imidazole 20 g. 2-benzyl-4,5-dimethyl oxazole are heated with 2 g. of ammonium chloride and 100 g. ethanolamine, under stirring, to 160° C. for five hours. Then, the excess ethanolamine is removed by distillation under reduced pressure and the residue is dissolved in 2 N $H_2SO_4$. Following treatment with activated carbon, the solution is rendered alkaline, first by means of NaOH and later by means of sodium carbonate, in the course of which N-(β-hydroxyethyl)-2-benzyl-4,5-dimethyl imidazole is precipitated. Following filtration, it is washed several times with water and acetone and dried. One obtains 16 g. of the desired product which can be purified even further by recrystallizing from ethanol and acetone and by treatment with activated carbon. Melting point 161–163° C.

EXAMPLE 21

1,8-di-[N-(β-hydroxyethyl)-4,5-dimethyl imidazole-2-yl]-octane 20 g. of 1,8-di-[4,5-dimethyl oxazole-2-yl]-octane, 60 g. ethanolamine and 1.5 g. ammonium chloride are heated under stirring to 160° C. for five hours. Excess ethanolamine is then removed by distillation under water-jet vacuum and the residue absorbed in 300 ml. 2 N $H_2SO_4$. The brown solution is treated with activated carbon and rendered alkaline with sodium carbonate. One obtains 23 g. of the desired product following filtering, washing in water, and drying. The raw product is further purified by dissolving in chloroform, treatment with activated carbon and precipitating by the addition of cyclohexane. One obtains 15.4 g. of pure 1,8-di-[N-(β-hydroxyethyl)-4,5-dimethyl imidazole-2-yl]-octane having a melting point of 152–155° C., as well as an additional 2.1 g. of another crystalline material having a melting point of 137–142° C.

EXAMPLE 22

N-furfuryl-2-undecyl-4,5-dimethyl imidazole 25 g. of furfurylamine, 75 g. of 2-undecyl-4,5-dimethyl oxazole, 30 g. ethyleneglycol and 3 g. ammonium chloride are heated to 150–155° C. for 7 hours. This is followed by vacuum distillation. At approx. 0.2 torr (bubbling temperature 240° C.), 5.5 g. 1-furfuryl-2-undecyl-4,5-dimethyl imidazole-hydrochloride are recovered between 170 and 185° C. In the first runnings one obtains unconverted initial product, as well as free 1-furfuryl-2-undecyl-4,5-dimethyl imidazole.

EXAMPLE 23

N-allyl-2-undecyl-4,5-dimethyl imidazole 50 g. 2-undecyl-4,5-dimethyl oxazole, 30 g. allylamine, 30 g. methanol and 1 g. ammonium chloride are heated to 160° C. in a glass-lined autoclave. The reaction mixture is worked up by distillation. Following first runnings consisting of products having a low boiling point, it converts to a distillate between 127 and 170° C. at 0.2 torr, which consists of approx. 80% of N-allyl-2-undecyl-4,5-dimethyl imidazole; the balance consists predominantly of 2-undecyl-4,5-dimethyl oxazole. On the whole, one obtains 20 g. of this mixture. A part of the allyl imidazole is isolated by fractional neutralization with hydrochloric acid over the hydrochloride as a practically colorless liquid. The identification of the product was made by elementary chemical analysis as well as by means of the NMR spectrum.

EXAMPLE 24

N-(β-methoxyethyl)-2-undecyl-4,5-dimethyl imidazole 48 g. 2-methoxy ethylamine and 1.4 g. ammonium chloride are heated together until the major part of $NH_3$ has escaped. Then 80 g. 2-undecyl-4,5-dimethyl oxazole are added and the mixture heated in a glass-lined autoclave to 180° C. for six hours. Unconverted initial materials were removed by distillation, the residue absorbed with butanol and aqueous potassium carbonate solution, the aqueous layer was extracted once again with butanol and the butanol extracts distilled. One obtains a fraction that goes over at 153–155° C. and approx. 0.5 torr as a bright yellow oil, which consists of N-(β-methoxyethyl)-2-undecyl-4,5-dimethyl imidazole in addition to traces of 2-undecyl-4,5-dimethyl oxazole and lauric acid methoxy ethylamide. Yield: 45 g.

EXAMPLE 25

N-(β-hydroxyethyl)-2-tridecyl-4,5-dimethyl imidazole 60 g. of 2-tridecyl-4,5-dimethyl oxazole, 65 g. ethanolamine and 3.5 g. acetic acid are heated under stirring to approx. 170° C. for 4 hours, with a small amount of water being distilled off. Thereupon, the unconverted initial materials are distilled off under vacuum. At 210° C. and approx. 0.3 torr, 31.5 g. raw N-(β-hydroxyethyl)-2-tridecyl-4,5-dimethyl imidazole are recovered. The product can be further purified by dissolving in hot ethanol, treatment with activated carbon and precipitation with water. Melting point 74° C.

EXAMPLE 26

N-(β-hydroxyethyl)-2,4,5-trimethyl imidazole 1 mol ethanolamine and 0.5 mol 2,4,5-trimethyl oxazole, still contaminated with a trace of acetic acid from its preparation, are heated to 130° C. for one hour. Thereupon, the reaction product is worked up by distillation. Under reduced pressure one obtains a fraction substantially consisting of N-(β-hydroxyethyl)-2,4,5-trimethyl imidazole. The yield corresponds to a 15% conversion. Upon repeating the test by admixing 5 weight percent acetic acid, with respect to the reaction mixture, the conversion could be increased to 90%. The replacing of the acetic acid by equimolar amounts of p-toluene sulfonic acid, ammonium chloride or concentrated hydrochloric acid in water results in yields of imidazole of 90, 72 and 52%.

EXAMPLE 27

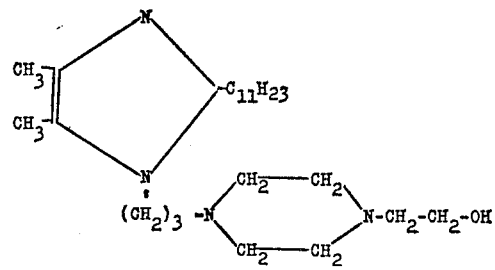

50 g. 2-undecyl-4,5-dimethyl oxazole and 50 g. N-(2-hydroxyethyl)-N-(3-aminopropyl)-piperazine are heated with 1 g. ammonium chloride to 160–180° C. for 8 hours. Then, the unconverted initial materials are distilled off under reduced pressure and the residue absorbed in ether and in aqueous potassium carbonate solution. The ether layer is treated with activated carbon, dried, and the solvent removed. As a residue, one obtains 50 g. of a brown oil that is highly viscous in the cold state and which, according to elementary analysis, NMR- and IR-spectra, is the expected imidazole.

EXAMPLE 28

N-(β-hydroxyethyl)-2-methyl-4,5-diphenyl imidazole

An ethereal solution of 2-methyl-4,5-diphenyl oxazole is made as follows: 28.8 g. benzoin acetate, 50 g. ammonium acetate and 200 g. acetic acid are boiled for 3 hours under reflux, then half of the acetic acid is distilled off, the residue is compounded with approximately the triple quantity of water, it is shaken out twice with ether, and the ethereal solution is neutralized with aqueous potassium carbonate solution—to this ether solution one adds 100 g. ethanolamine and 3 g. ammonium chloride and the solvent is distilled off. The reaction mixture is then heated for 8 hours to 160–165° C., after cooling it is diluted with water, the eliminated oil is taken up with ether and purified with activated carbon. Then it is shaken out with 1 N HCl, the acid phase is treated with activated carbon and the reaction product is again precipitated with ammonia solution. A tenacious yellow oil is separated, which is separated from the aqueous phase and which solidifies after standing for a short while. Ether is poured over the solid mass. After a few hours the ether solution is brown and a sediment of 42 g. N-(β-hydroxyethyl) 2-methyl-4,5-diphenyl imidazole has formed. After recrystallizing from ethanol one obtains white needles with melting point 203–204° C.

EXAMPLE 29

N-[octadecene(9)-yl(1)]-2,4,5-trimethyl imidazole 87 g. oleylamine, 101 g. 2,4,5-trimethyl oxazole and 3.6 g. ammonium chloride are heated together for 8 hours. The reaction temperature is gradually increased from the initial 124° C. to 153° C. The water formed as a result of the above is distilled off as azeotrope with trimethyl oxazole. After the water has been dehydrated (with potassium carbonate) the distilled oxazole is reintroduced into the reaction mixture.

In the course of the distillation at 220–225° C. and about 0.5 torr 55 g. N-[octadecane(9)-yl(1)]-2,4,5-trimethyl imidazole are obtained as a bright yellow oil. The first running and residue of the distillation contain about 40 more grams of the product.

EXAMPLE 30

N-(β-hydroxyethyl)-2,4,5-trimethyl imidazole 55 g. trimethyl oxazole, 61 g. ethanolamine and 3 g. Cu(OCOCH₃)₂·H₂O are heated for one hour to 130° C. Next the reaction mixture is distilled in vacuum, and as a result 32 g. N-(β-hydroxyethyl)-2,4,5-trimethyl imidazole are obtained. In the course of the reaction the copper (II) acetate is reduced to copper (I) compound. The thus released acetic acid acts as a catalyst.

When copper (II) hydroxide is used instead of copper (II) acetate, all other conditions being equal, only 8 g. imidazole are obtained.

On the other hand, with copper (II) chloride or iron (III) chloride as catalysts, the yield of 1-(β-hydroxyethyl)-2,4,5-trimethyl imidazole is similar to that with copper (II) acetate. The metallic chlorides are also reduced in the course of the reaction.

The invention claimed is:

1. Process for manufacturing an imidazole which comprises reacting an oxazole of the formula

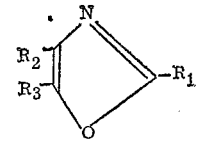

where $R_1$ is selected from the group consisting of hydrogen, alkyl of up to 18 carbon atoms, alkenyl of up to 18 carbon atoms, wherein the double bond does not stand in conjunction with the double bond of the oxazole ring and benzyl; $R_2$ and $R_3$ are selected from the group consisting of hydrogen, lower alkyl and phenyl; with a primary amine of the formula $NH_2R$ where R is selected from the group consisting of alkyl of up to 12 carbon atoms and alkenyl of up to 12 carbon atoms either of which may be substituted by amino-, hydroxy- and lower alkoxy-substituents, benzyl, phenyl, furfuryl and N-(2-hydroxyethyl)-N'-propyl-piperazine, in the presence of a hydrogen ion splitting compound having a dissociation constant in water of at least $10^{-10}$ in the amount of at least 0.01 mol percent with respect to the amine used.

2. Process according to claim 1, in which the hydrogen ion splitting compound is added to the reaction mixture in quantities of 1–10 mol percent with respect to the amine.

3. Process according to claim 1, in which the conversion is performed at a temperature of 100 to 200° C.

References Cited

Cornforth: In: Elderfield Heterocyclic Compounds, vol. 5, pp. 330–1, N.Y., Wiley, 1957.

Cornforth et al.: J. Chem. Soc. (London), 1947, pp. 96–102.

Cornforth et al.: J. Chem. Soc. (London), 1948, pp. 1960–4.

Cornforth et al.: J. Chem. Soc. (London), 1952, pp. 1085–8.

Lewy Berichte, vol. 21, pp. 2192–6 (1888).

Schipper et al.: In: Elderfiied Heterocyclic Compounds, vol. 5, p. 214, N.Y., Wiley, 1957.

NATALIE TROUSOF, Primary Examiner

U.S. Cl. X.R.

117—139.5 R; 252—8.8; 260—307 R, 309